[12] United States Patent
Ohashi

(10) Patent No.: US 7,132,722 B2
(45) Date of Patent: Nov. 7, 2006

(54) PHYSICAL QUANTITY SENSOR

(75) Inventor: Toshio Ohashi, Hamakita (JP)

(73) Assignee: Yamaha Corporation (JP)

(*) Notice: Subject to any disclaimer, the term of this patent is extended or adjusted under 35 U.S.C. 154(b) by 93 days.

(21) Appl. No.: 11/049,665

(22) Filed: Feb. 4, 2005

(65) Prior Publication Data
US 2005/0194651 A1 Sep. 8, 2005

(30) Foreign Application Priority Data
Feb. 9, 2004 (JP) ............................. 2004-031620

(51) Int. Cl.
*H01L 29/84* (2006.01)
(52) U.S. Cl. .................. 257/415; 257/414; 73/514.32; 73/514.34
(58) Field of Classification Search ............... 257/414, 257/415; 73/514.32, 514.34
See application file for complete search history.

(56) References Cited

U.S. PATENT DOCUMENTS 5,500,549 A * 3/1996 Takeuchi et al. ............ 257/415
5,559,290 A * 9/1996 Suzuki et al. ............ 73/514.36
6,192,757 B1 * 2/2001 Tsang et al. ............. 73/514.32
6,285,063 B1 * 9/2001 Splett et al. ................ 257/415

FOREIGN PATENT DOCUMENTS

JP    S62-174978    7/1987

* cited by examiner

*Primary Examiner*—Gene M. Munson
(74) *Attorney, Agent, or Firm*—Dickstein, Shapiro, LLP.

(57) ABSTRACT

A physical quantity sensor is constituted using a plurality of piezoelectric sensors each having first and second semiconductor layers realizing resistances and terminals, and a conductive weight portion in relation to an opening of an insulating film that partially exposes the main surface of a substrate. Both the semiconductor layers are elongated from the periphery of the opening on the insulating film inwardly into the opening so as to three-dimensionally support the conductive weight portion in a floating manner, thus realizing three-dimensional displacement. A capacitance electrode layer is arranged in the bottom of the opening on the main surface of the substrate so as to establish capacitance with the conductive weight portion. The displacement of the conductive weight portion is detected based on resistance variations and capacitance variations. Thus, it is possible to detect physical quantity such as acceleration, vibration, and inclination with a reduced chip size.

5 Claims, 13 Drawing Sheets

PHYSICAL QUANTITY SENSOR

BACKGROUND OF THE INVENTION

1. Field of the Invention

This invention relates to physical quantity sensors that detect physical quantities such as accelerations, vibrations, and inclinations in a two-dimensional manner or in a three-dimensional manner, and relates in particular to electrostatic capacity type piezoelectric sensors that can be manufactured in accordance with semiconductor manufacturing processes.

This application claims priority on Japanese Patent Application No. 2004-31620, the content of which is incorporated herein by reference.

2. Description of the Related Art

Conventionally, various types of piezoelectric sensors having abilities of detecting accelerations in a three-dimensional manner have been developed, wherein Japanese Patent Application Publication No. S62-174978 discloses an example of a piezoelectric sensor as shown in FIG. 14.

In the piezoelectric sensor shown in FIG. 14, an X-axis detector 2X, a Y-axis detector 3Y, and a Z-axis detector 4Z are arranged on the main surface of a substrate 1, on which a peripheral circuit 5 is also arranged to process directional information produced by the detectors 2X, 3Y, and 4Z. Herein, both of the X-axis direction and Y-axis direction lie in parallel with the main surface of the substrate 1 having a rectangular shape defined by short sides and long sides, wherein the X-axis direction lies in parallel with the short side of the substrate 1, and the Y-axis direction lies in parallel with the long side of the substrate 1. The Z-axis direction lies vertically perpendicular to the main surface of the substrate 1, and it also lies perpendicular to the X-axis direction and the Y-axis direction respectively.

The X-axis detector has three movable members 2a to 2c, each of which is supported in a cantilever manner and which differ from each other in length, wherein the tip ends of the movable members 2a to 2c are each broadened in width in order to realize weight functions therefor. The movable members 2a to 2c are each subjected to displacement in response to acceleration applied thereto in the X-axis direction, wherein the longer one is increased in displacement. The Y-axis detector 3Y has three movable members 3a to 3c, each of which is supported in a cantilever manner and which differ from each other in length, wherein the tip ends of the movable members 3a to 3c are each broadened in width in order to realize weight functions therefor. The movable members 3a to 3c are each subjected to displacement in response to acceleration applied thereto in the Y-axis direction, wherein the longer one is increased in displacement. Similarly, the Z-axis detector 4Z has three movable members 4a to 4c, each of which is supported in a cantilever manner and which differ from each other in length, wherein the tip ends of the movable members 4a to 4c are each broadened in width in order to realize weight functions therefor. The movable members 4a to 4c are each subjected to displacement in response to acceleration applied thereto in the Z-axis direction, wherein the longer one is increased in displacement.

All of the movable members 2a–2c, 3a–3c, and 4a–4c are produced by etching silicon materials used for the substrate 1, wherein the base portion of each movable member has piezoresistance realized by diffusion resistance. Hence, each movable member can convert displacement thereof into an electric signal by use of the piezoresistance.

As described above, the conventionally known piezoelectric sensor is designed such that the X-axis detector 2X having the movable members 2a–2c, which are specifically used for the detection of the acceleration in the X-axis direction, the Y-axis detector 3Y having the movable members 3a–3c, which are specifically used for the detection of the acceleration in the Y-axis direction, and the Z-axis detector 4Z having the movable members 4a–4c, which are specifically used for the detection of the acceleration in the Z-axis direction, are arranged on the main surface of the substrate 1. This increases the total area occupied by the detectors 2X, 3Y, and 4Z, which in turn increase the overall chip size.

SUMMARY OF THE INVENTION

It is an object of the invention to provide a small-size physical quantity sensor (e.g., an electrostatic capacity type piezoelectric sensor) that can detect the physical quantity such as acceleration, vibration, and inclination in a two-dimensional manner or in a three-dimensional manner.

In a first aspect of the invention, a physical quantity sensor includes a substrate; an insulating film having an opening, which is formed to partially expose a main surface of the substrate; a plurality of piezoelectric sensors each having two terminals, wherein each piezoelectric sensor is constituted such that a sensing portion thereof is arranged in the opening while being supported by the two terminals attached onto the insulating film at opposite positions in the periphery of the opening, and wherein each piezoelectric sensor comprises a first semiconductor layer having a coil-like winding pattern that is elongated from the periphery of the opening of the insulating film inwardly into the opening, a second semiconductor layer having a coil-like winding pattern that is elongated from the periphery of the opening of the insulating film inwardly into the opening, and a conductive weight portion that mutually connects the internal ends of the first and second semiconductor layers in the opening, whereby the external ends of the first and second semiconductor layers attached onto the insulating film are used to form the two terminals, and the conductive weight portion is supported by the first and second semiconductor layers in a floating manner in the opening so as to realize three-dimensional displacement therewith; and a capacitance electrode layer, which is arranged in the bottom of the opening on the main surface of the substrate so as to establish capacitance between the capacitance electrode layer and the conductive weight portion, whereby the displacement of the conductive weight portion is detected based on variations of resistances of the first and second semiconductor layers and variations of the capacitance.

In the above, under the condition in which the main surface of the substrate is directed upwardly, the conductive weight portion of the piezoelectric sensor is supported by the first and second semiconductor layers having coil-like shapes so as to realize three-dimensional displacement therewith. That is, the conductive weight portion of the piezoelectric sensor is subjected to displacement in response to 'horizontal' acceleration applied in parallel with the main surface of the substrate, and it is also subjected to displacement in response to 'vertical' acceleration applied in the vertical direction perpendicular to the main surface of the substrate. The displacement of the conductive weight portion can be detected based on resistance variations of the first and second semiconductor layers (due to piezoresistance effects) and capacitance variations. Herein, capacitance variations do not occur in response to horizontal acceleration but occur in response to vertical acceleration; therefore, it is possible to discriminate the direction of the acceleration, which is applied in the horizontal direction or vertical direction, with reference to capacitance variations. This makes it possible to realize two-dimensional detection of a physical quantity such as acceleration by use of a single piezoelectric sensor; thus, it is possible to reduce the overall chip size of the physical quantity sensor.

In addition, it is possible to further provide a second capacitance electrode layer that establishes second capacitance with respect to the first and second semiconductor layers, wherein the displacement of the conductive weight portion is detected with reference to variations of the second capacitance. That is, when acceleration is applied to the substrate in the X-axis direction or the Y-axis direction on the main surface of the substrate, it is possible to discriminate the direction of the acceleration with reference to variations of the capacitances; hence, it is possible to realize three-dimensional detection of physical quantity.

In a second aspect of the invention, a physical quantity sensor includes a substrate; an insulating film having an opening, which is formed to partially expose the main surface of the substrate; a plurality of piezoelectric sensors each having two terminals and a sensing portion, wherein the sensing portion is supported in a floating manner in the opening by the two terminals attached at different positions in the periphery of the opening of the insulating film, and wherein each piezoelectric sensor includes first and second semiconductor layers that are elongated from the periphery of the opening of the insulating film inwardly into the opening in parallel with each other, and a conductive weight portion that mutually connects the internal ends of the first and second semiconductor layers in the opening, whereby the external ends of the first and second semiconductor layers are attached onto the insulating film so as to form the two terminals, and the conductive weight portion is supported by the first and second semiconductor layers so as to realize three-dimensional displacement therewith; and a capacitance electrode layer, which is arranged in the bottom of the opening on the main surface of the substrate so as to form capacitance between the conductive weight portion and the capacitance electrode layer, whereby the displacement of the conductive weight portion is detected based on variations of resistances of the first and second semiconductor layers and variations of the capacitance.

In the above, under the condition in which the main surface of the substrate is directed upwardly, the conductive weight portion of the piezoelectric sensor is supported by the first and second semiconductor layers, which are elongated in parallel with each other, so as to realize three-dimensional displacement therewith. When the first and second semiconductor layers are elongated in the Y-axis direction on the main surface of the substrate that is supported horizontally, and when the substrate is rotated about a rotation axis, which lies in parallel with the X-axis direction, and is therefore inclined, the conductive weight portion is subjected to displacement only in the direction perpendicular to the main surface of the substrate. When the substrate is rotated about another rotation axis, which lies in parallel with the Y-axis direction, and is therefore inclined, the conductive weight portion is subjected to bidirectional displacement in the X-axis direction and in the direction perpendicular to the main surface of the substrate. The aforementioned displacement of the conductive weight portion is detected based on variations of resistances of the first and second semiconductor layers and variations of capacitance. Compared with resistance variations and capacitance variations that occur when the substrate is inclined about the rotation axis lying in parallel with the X-axis direction, smaller resistance variations and capacitance variations occur when the substrate is inclined about the rotation axis lying in parallel with the Y-axis direction. This operating principle makes it possible to detect the inclination angle and inclination direction based on resistance variations and capacitance variations. Thus, it is possible to detect physical quantity such as inclination in a two-dimensional manner; hence, it is possible to reduce the overall chip size.

In a third aspect of the invention, a physical quantity sensor includes a substrate; an insulating film having an opening, which is formed to partially expose a main surface of the substrate; a plurality of piezoelectric sensors each having a sensing portion and two terminals, wherein the sensing portion is supported in a cantilever manner in relation to the opening, and wherein each piezoelectric sensor includes first and second semiconductor layers that are elongated from the periphery of the opening of the insulating film inwardly into the opening in parallel with each other, and a conductive weight portion that mutually connects the internal ends of the first and second semiconductor layers in the opening, whereby the external ends of the first and second semiconductor layers are attached onto the insulating film so as to form the two terminals, and the conductive weight portion is supported by the first and second semiconductor layers so as to realize three-dimensional displacement therewith; and a plurality of capacitance electrode layers, which are arranged in the bottom of the opening on the main surface of the substrate so as to form capacitances between the conductive weight portion and the capacitance electrode layers respectively, whereby the displacement of the conductive weight portion is detected based on variations of resistances of the first and second semiconductor layers and variations of the capacitances.

In the above, plural piezoelectric sensors are each supported in a cantilever manner over the opening, and they are elongated from different positions on the insulating film inwardly into the opening in the X-axis direction and Y-axis direction respectively. By combining plural piezoelectric sensors each capable of detecting inclination therewith, it is possible to precisely measure a physical quantity in a two-dimensional manner. Since the sensing portions of plural piezoelectric sensors are collectively arranged in a single opening, it is possible to reduce the overall chip size.

As described above, this invention realizes a small-size physical quantity sensor that is capable of detecting physical quantity such as acceleration, vibration, and inclination in a two-dimensional manner or in a three-dimensional manner with the reduced overall chip size therefor. This physical quantity sensor is constituted using capacitance type piezoelectric sensors basically composed of semiconductor layers; hence, it can be easily produced by semiconductor manufacturing processes. Thus, physical quantity sensors can be easily integrated together with peripheral circuits and signal processing circuits.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

This invention will be described in further detail by way of examples with reference to the accompanying drawings.

Figure 1:
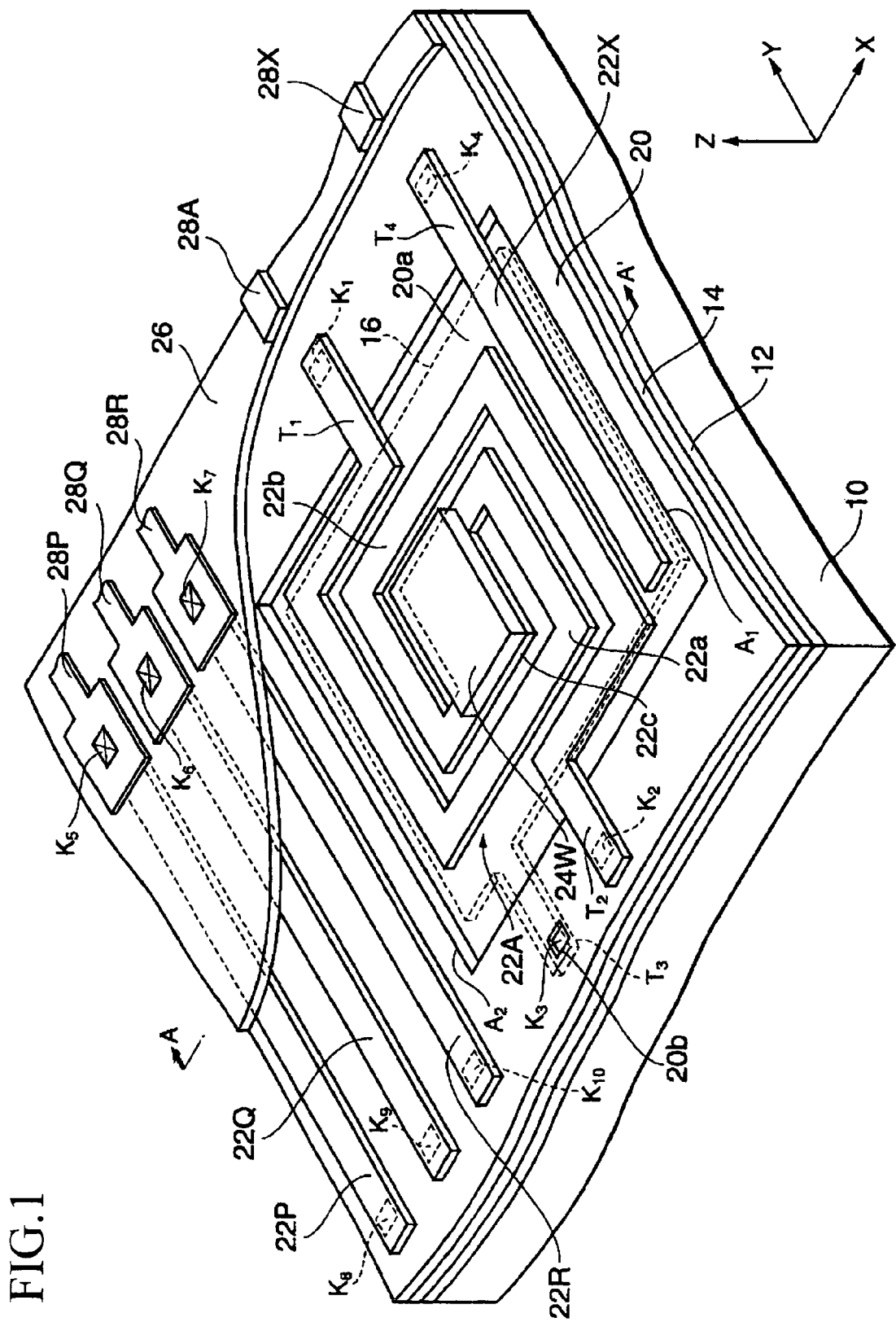
FIG. 1 is a perspective view showing an IC device equipped with a physical quantity sensor in accordance with a preferred embodiment of the invention.

FIG. 1 shows an IC device equipped with a physical quantity sensor in accordance with a preferred embodiment of the invention.

In FIG. 1, the main surface of a semiconductor substrate 10 composed of single crystal silicon is covered with an insulating film 12 composed of silicon oxide, on which an insulating film 14 composed of silicon oxide is further formed.

A capacitance electrode layer 16 composed of metals or semiconductors is formed on the insulating film 14. The capacitance electrode layer 16 can be covered with an insulating film composed of silicon nitride. An insulating layer 20 composed of silicon oxide is formed on the insulating film 14. The insulating layer 20 has a 'rectangular' opening 20a allowing the sensing portion of a piezoelectric sensor 22A to be arranged above the capacitance electrode layer 16. The insulating film 20 is formed to cover a terminal $T_3$ of the capacitance electrode layer 16, wherein the terminal $T_3$ has a connection hole 20b for exposing a contact $K_3$. The contact $K_3$ is connected with a wiring layer (not shown) via the connection hole 20b.

The piezoelectric sensor 22A has terminals $T_{1\ and\ T2}$, which project from opposite sides thereof and are respectively fixed to opposite sides of the insulating film 20, wherein the sensing portion thereof is arranged in the opening 20a by being supported by the terminals $T_1$ and $T_2$. The piezoelectric sensor 22A includes a first semiconductor layer 22a having a coil-like winding pattern extending inwardly at one side of the opening 20a on the insulating film 20, a second semiconductor layer 22b having a coil-like winding pattern extending inwardly at the other side of the opening 20a on the insulating film 20, and a third semiconductor layer 22c that is formed continuously with internal ends of the semiconductor layers 22a and 22b and is equipped with a weight layer 24W thereon, wherein the terminals $T_{1\ and\ T2}$ are formed by fixing external ends of the semiconductor layers 22a and 22b onto the insulating film 20. The sensing portion is realized by supporting the third semiconductor layer 22c with the first and second semiconductor layers 22a and 22b in a three-dimensional manner. All the semiconductor layers 22a to 22c are composed of doped polysilicon and the like, and the weight layer 24W is composed of tungsten or tungsten silicide, for example. Tungsten is present in a high concentration to produce a sufficient inertial mass with a relatively small pattern. Capacitance (or electrostatic capacity) is realized between the semiconductor layers 22a to 22c and the capacitance electrode layer 16.

On the right side of the second semiconductor layer 22b, a capacitance electrode layer 22X is arranged to extend in parallel with a prescribed side $A_1$ of the opening 20a. The capacitance electrode layer 22X has a terminal $T_4$, which is fixed onto the insulating film 20. Capacitance is realized between the second semiconductor layer 22b and the capacitance electrode layer 22X. The capacitance electrode layer 22X is formed in a cantilever manner; however, it can be formed as a fixed electrode layer extending on the side wall of the opening 20a or on the insulating film 20.

Resistance layers 22P, 22Q, and 22R each composed of doped polysilicon are arranged in parallel on the insulating layer 20, wherein they are used to form a bridge circuit together with the piezoelectric sensor 22A. The resistance layers 22P, 22Q, and 22R can be commonly formed together with the piezoelectric sensor 22A by sharing some processes. For example, doped polysilicon layers are deposited to realize impurity concentrations preferably suited to the formation of the piezoelectric sensor 22A; then, ion implantation is performed to adjust impurity concentrations at prescribed portions, which are used for the formation of the resistance layers 22P, 22Q, and 22R, in the doped polysilicon layers.

An interlayer insulating film 26 composed of silicon oxide is formed to cover the resistance layers 22P, 22Q, 22R, the terminals $T_{1\ and\ T2}$ of the piezoelectric sensor 22A, and the terminal $T_4$ of the capacitance electrode layer 22X on the insulating film 20. The interlayer insulating film 26 has an opening in correspondence with the opening 20a of the insulating film 20. Thus, the sensing portion of the piezoelectric sensor 22A and the beam portions of the capacitance electrode layer 22X are floated in the air within the hollow, which is formed by the opening 20a and the opening of the interlayer insulating film 26, above the capacitance electrode layer 16.

Wiring layers 28A and 28X are formed on the interlayer insulating film 26. The wiring layer 28A is connected with the contact $K_1$ of the terminal $T_1$ of the piezoelectric sensor 22A via a connection hole. Similarly, the contact $K_2$ of the terminal $T_2$ of the piezoelectric sensor 22A is connected with a wiring layer (not shown). The wiring layer 28X is connected with the contact $K_4$ of the terminal $T_4$ of the capacitance electrode layer 22X via a connection hole of the interlayer insulating film 26.

Wiring layers 28P, 28Q, and 28R are formed on the interlayer insulating film 26. They are respectively connected with contacts $K_5$, $K_6$, and $K_7$, which are formed on one ends of the resistance layers 22P, 22Q, and 22R, via connection holes of the interlayer insulating film 26. Similarly, other wiring layers (not shown) are respectively connected with contacts $K_8$, $K_9$, and $K_{10}$, which are formed on the other ends of the resistance layers 22P, 22Q, and 22R, via connection holes of the interlayer insulating film 26.

A passivation insulating film (which will be described in conjunction with FIG. 6) composed of silicon nitride is formed to cover the wiring layers 28A, 28X, 28P, 28Q, and 28R on the interlayer insulating film 26. This passivation insulating film has an opening by which the sensing portion of the piezoelectric sensor 22A and the beam portions of the capacitance electrode layer 22X are exposed above the opening 20a.

Suppose that in the condition where the main surface of the substrate 10 is directed upwardly, the terminals $T_{1\ and\ T2}$ and the third semiconductor layer 22c are arranged linearly in the Y-axis direction (matching the extending direction of the capacitance electrode layer 22X) within the X-axis direction and Y-axis direction perpendicularly crossing each other above the main surface of the substrate 10. Herein, the third semiconductor layer 22c is subjected to displacement in response to acceleration (or vibration) in the Z-axis direction, which perpendicularly crosses both of the X-axis direction and Y-axis direction as well as the main surface of the substrate 10. The third semiconductor layer 22c is also subjected to displacement in response to acceleration (or vibration) in the X-axis direction and the Y-axis direction respectively. The displacement of the third semiconductor layer 22c can be detected in a three-dimensional manner based on resistance variations of the first and second semiconductor layers 22a and 22b, capacitance variations of the capacitance electrode layer 16, and capacitance variations of the capacitance electrode layer 22X. That is, it is possible to detect acceleration (or vibration) in a three-dimensional manner by detecting the displacement of the third semiconductor layer 22c.

Figure 2:
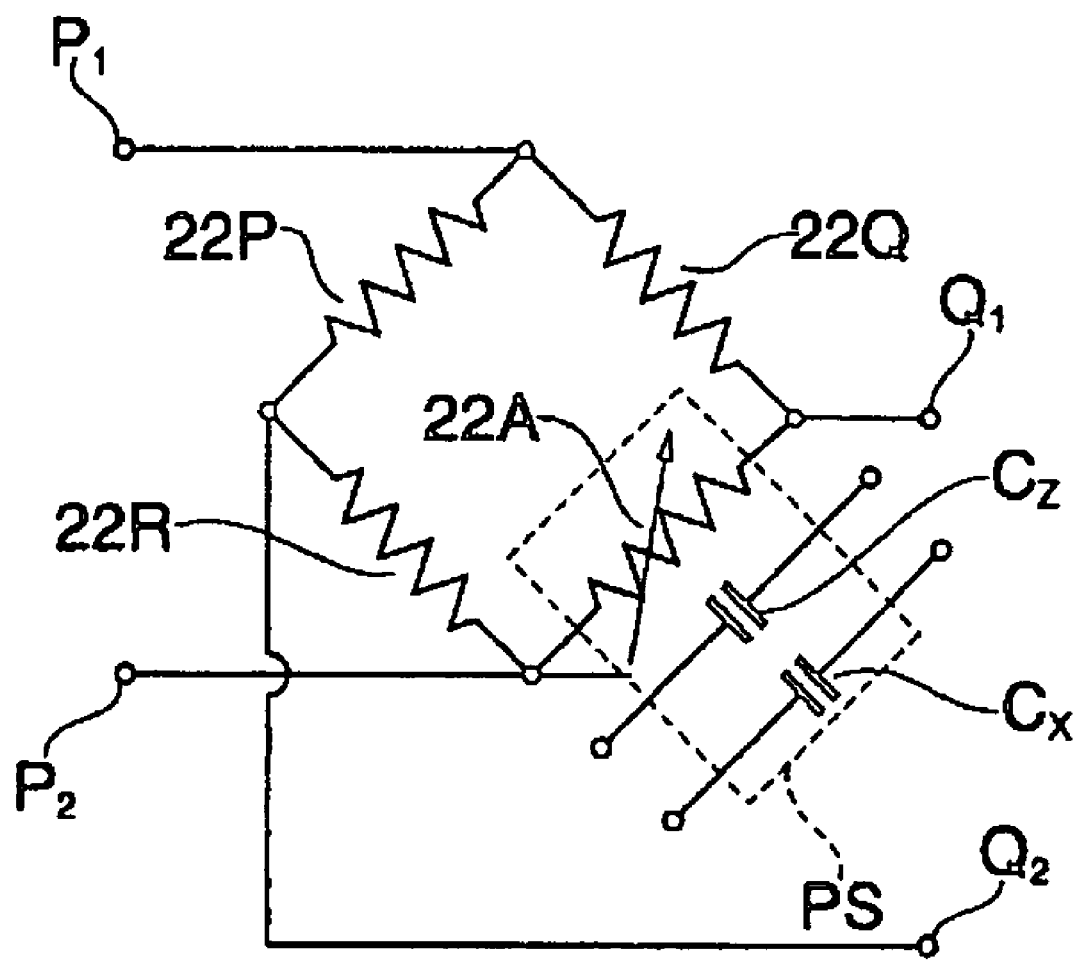
FIG. 2 is a circuit diagram showing an equivalent circuit simulating actual behavior of the physical quantity sensor.

FIG. 2 shows an equivalent circuit simulating the actual behavior of the physical quantity sensor 'PS' shown in FIG. 1, wherein the resistance layers 22P, 22Q, and 22R and the piezoelectric sensor 22A are connected together to form a bridge circuit. A power terminal $P_1$ is connected with one ends of the resistance layers 22P and 22Q; and a power terminal $P_2$ is connected with one end of the resistance layer 22R and one end of the piezoelectric sensor 22A. An output terminal $Q_1$ is connected with the other end of the resistance layer 22Q and the other end of the piezoelectric sensor 22A; and an output terminal $Q_2$ is connected with the other ends of the resistance layers 22P and 22R. Using the aforementioned bridge circuit, it is possible to extract electric signals via the output terminals $Q_1$ and $Q_2$ in response to resistance variations of the first and second semiconductor layers 22a and 22b of the piezoelectric sensor 22A.

The physical sensor PS includes capacitances Cz and Cx in addition to the piezoelectric sensor 22A. The capacitance Cz is formed between the capacitance electrode layer 16 and the semiconductor layers 22a to 22c, wherein it is varied in response to the displacements of the semiconductor layers 22a to 22c in the Z-axis direction. The capacitance Cx is formed between the capacitance electrode layer 22X and the semiconductor layer 22b, wherein it is varied in response to the displacement of the semiconductor layer 22b in the X-axis direction. Thus, it is possible to determine the direction in which acceleration is applied to the physical quantity sensor PS with reference to capacitance variations of the capacitances Cz and Cx.

It is possible to modify the physical quantity sensor PS in such a way that the capacitance electrode layer 16 is reduced in size so as to form the capacitance Cz only between the capacitance electrode layer 16 and the semiconductor layer 22c. It is possible to modify the physical quantity sensor PS in such a way that the capacitance electrode layer 22X is formed in parallel with another side $A_2$ opposite to the side $A_1$ of the opening 20a and is elongated so as to form the capacitance Cx between the capacitance electrode layer 22X and the semiconductor layer 22a. It is possible to arrange a capacitance for detecting displacement in the Y-axis direction, in addition to or instead of the capacitance Cx.

Figure 5:
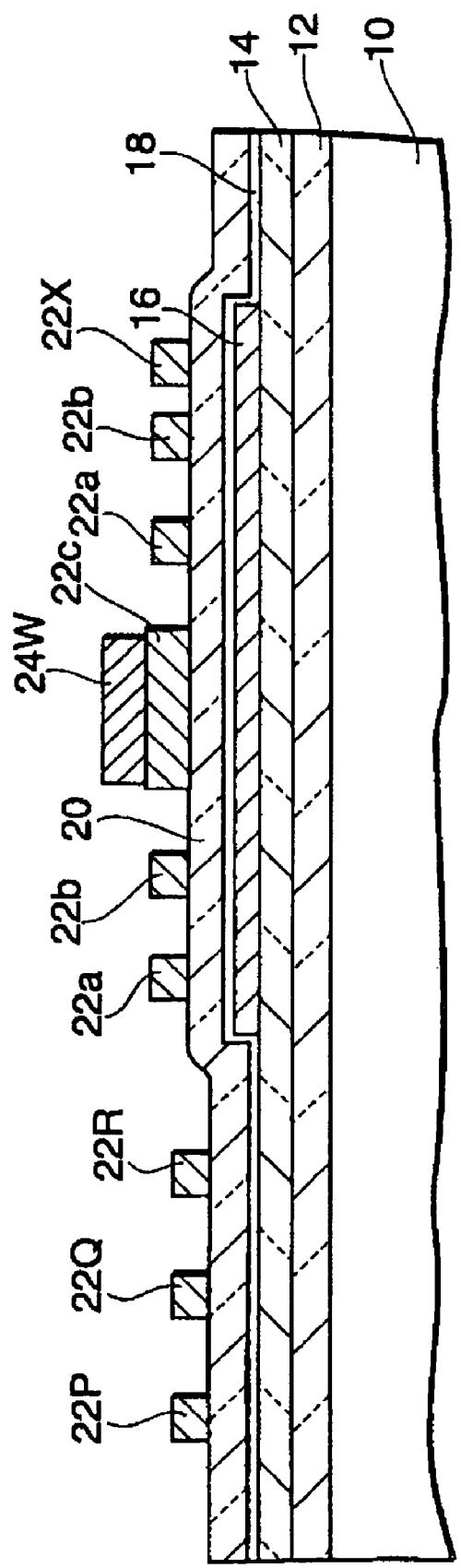
FIG. 5 is a cross-sectional view showing a third step regarding patterning and deposition in the manufacturing method for the IC device shown in FIG. 1.
Figure 6:
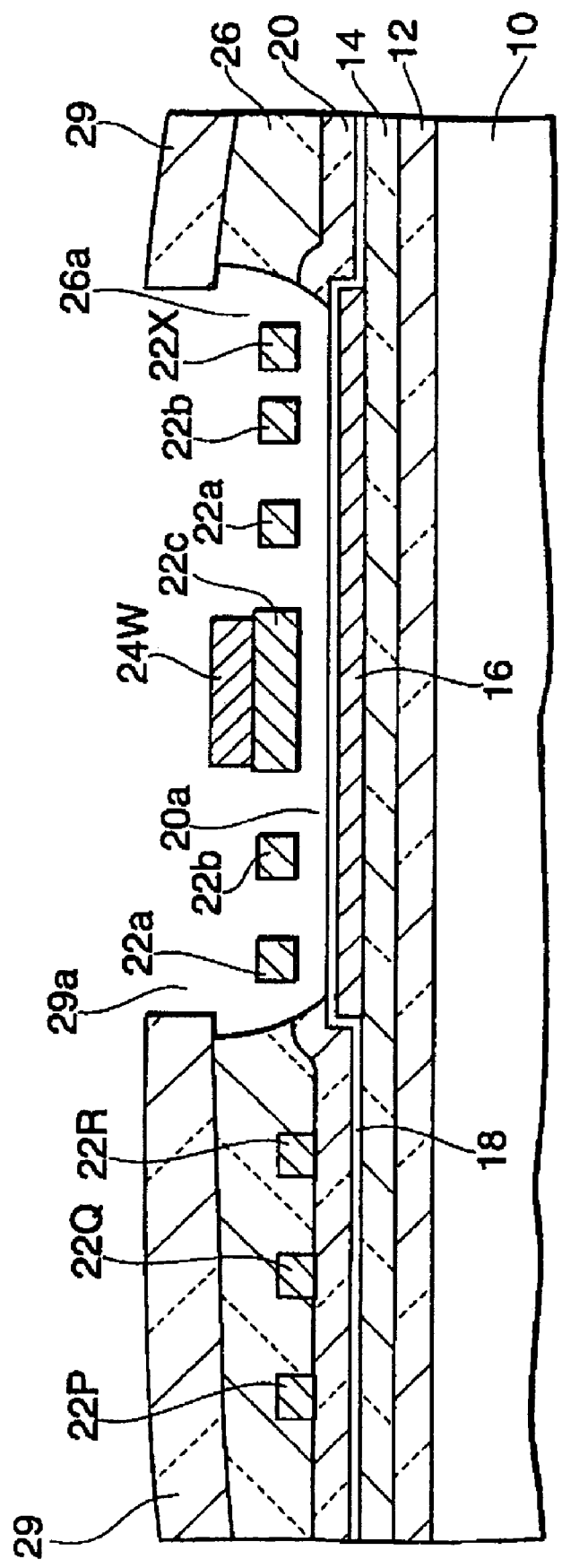
FIG. 6 is a cross-sectional view showing a fourth step regarding passivation and opening formation in the manufacturing method for the IC device shown in FIG. 1.
Figure 7:
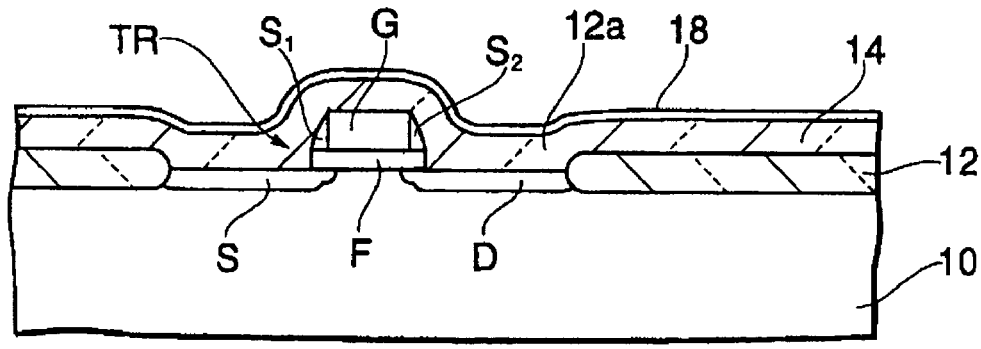
FIG. 7 is a cross-sectional view showing a transistor-related region in relation to the first step shown in FIG. 3.
Figure 8:
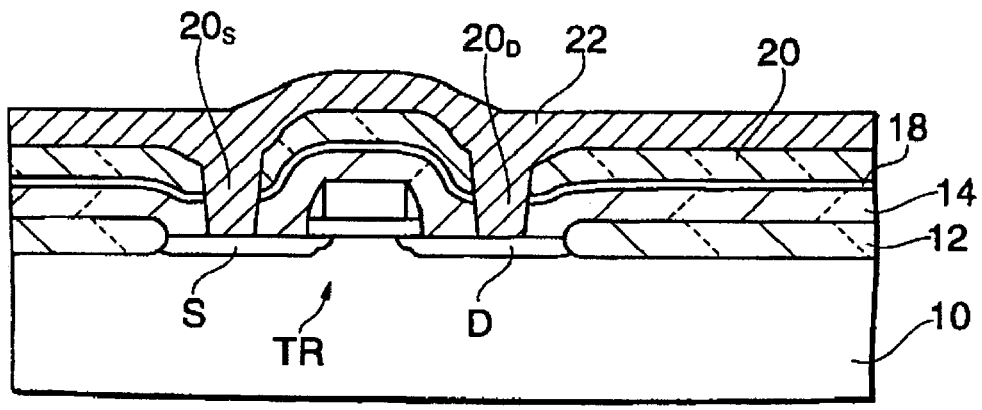
FIG. 8 is a cross-sectional view showing the transistor-related region in relation to the second step shown in FIG. 4.
Figure 9:
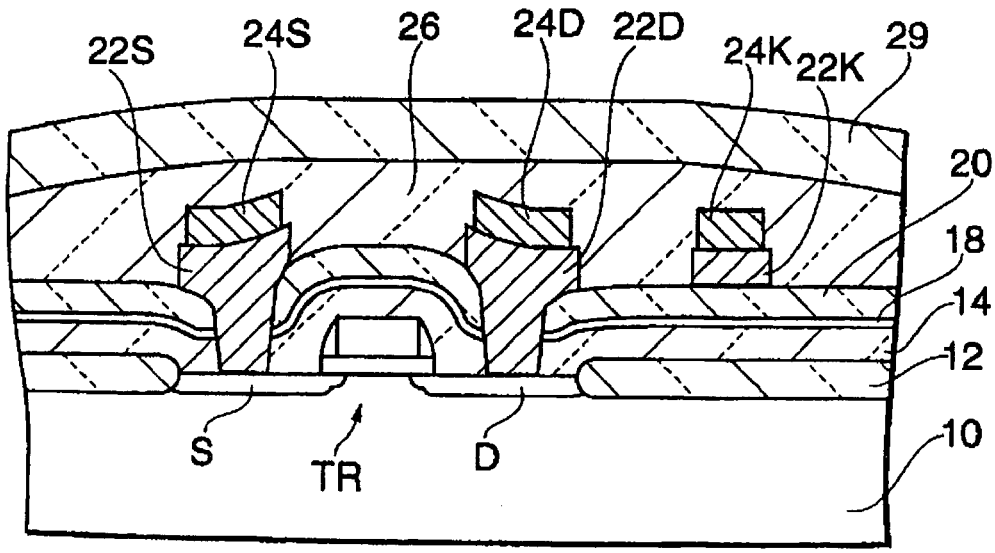
FIG. 9 is a cross-sectional view showing the transistor-related region in relation to the third step shown in FIG. 5 and the fourth step shown in FIG. 6.

FIGS. 3 to 9 show steps for manufacturing the IC device having the physical quantity sensor shown in FIG. 1, wherein FIGS. 3 to 6 are cross-sectional views taken along line A–A' in FIG. 1; and FIGS. 7 to 9 are cross-sectional views regarding transistor-related regions in FIGS. 3 to 6, and wherein parts identical to those shown in FIG. 1 are designated by the same reference numerals; hence, the detailed description thereof will be omitted.

Figure 3:
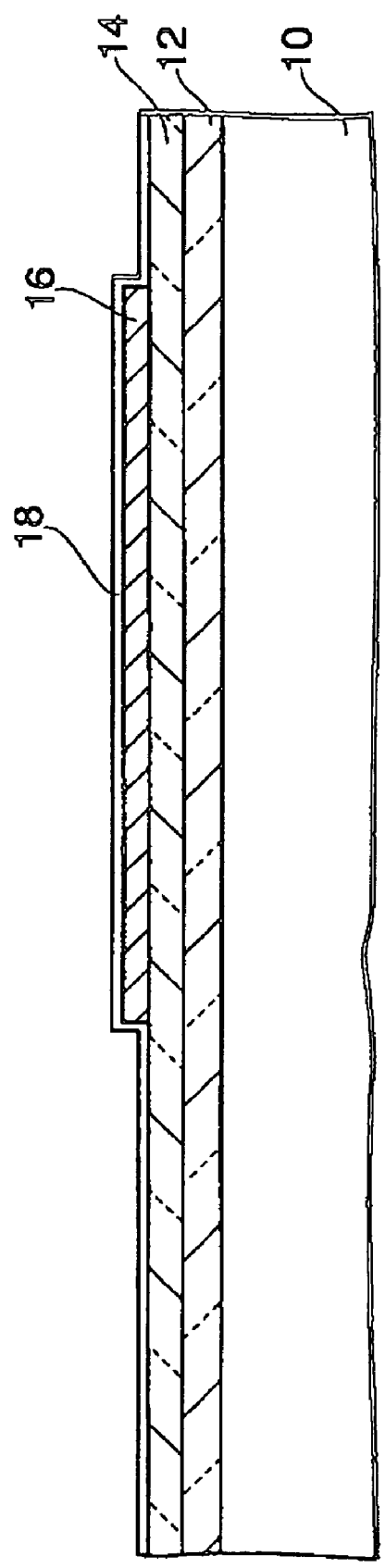
FIG. 3 is a cross-sectional view showing a first step regarding the formation of insulating films in a manufacturing method for the IC device shown in FIG. 1.

In a first step shown in FIGS. 3 and 7, a field insulating film 12 composed of silicon oxide is formed on the main surface of a semiconductor substrate 10 in accordance with the selective oxidation process. As shown in FIG. 7, a MOSFET (i.e., a metal-oxide semiconductor field-effect transistor) TR (simply referred to as a transistor TR) is formed in an element hole 12a of the field insulating film 12 on the surface of the substrate 10 in accordance with the known process. In the transistor TR, reference symbol F designates a gate insulating film; reference symbol G designates a gate electrode layer; reference symbols $S_1$ and $S_2$ designate side spacers; reference symbol S designates a source region; and reference symbol D designates a drain region. Incidentally, it is possible to form the field insulating film 12 in accordance with the so-called shallow trench isolation (STI) method, wherein the field insulating film 12 is formed as a shallow trench and is constituted by an insulating film composed of silicon oxide that is formed by the chemical vapor deposition (CVD) method. It is preferable to form a relatively large shallow trench entirely under a capacitance electrode layer 16 by use of a relatively large pattern in consideration of influences to the substrate 10.

Next, an insulating film 14 composed of silicon oxide or doped silicon oxide (such as PSG (i.e., phosphorous silicic acid glass), BSG (i.e., boron silicic acid glass), and BPSG (i.e., boron phosphorus silicic acid glass)) is formed in accordance with the CVD method so as to cover the transistor TR and the field insulating film 12. The insulating film 14 is used as a pad film, wherein the thickness thereof ranges from 20 nm to 500 nm, preferably, it is set to 100 nm.

Next, the capacitance electrode layer 16 is formed on the insulating film 14. That is, prescribed electrode materials such as doped polysilicon, metal, or metal silicide are attached onto the surface of the substrate 10; then, they are subjected to patterning by photolithography and dry etching. As electrode materials, it is possible to use laminated materials using two or more elements selected from among doped polysilicon, metal, and metal silicide. As the metal, it is possible to use aluminum and aluminum alloy. Alternatively, it is possible to use rare metal such as gold and silver, tungsten, and high melting point metals such as molybdenum and titanium. Polysilicon can be subjected to adhesion by the CVD method, and metal or silicide can be subjected to adhesion by sputtering.

Next, an insulating film 18 composed of silicon nitride is formed by the CVD method so as to cover the capacitance electrode layer 16 on the insulating film 14. The insulating film 18 is used as an etching stopper film in the other step shown in FIG. 6, wherein the thickness thereof ranges from 50 nm to 350 nm, preferably, it is set to 140 nm. Incidentally, it is possible to omit the insulating film 18 when the capacitance electrode layer is constituted by a polysilicon layer.

Figure 4:
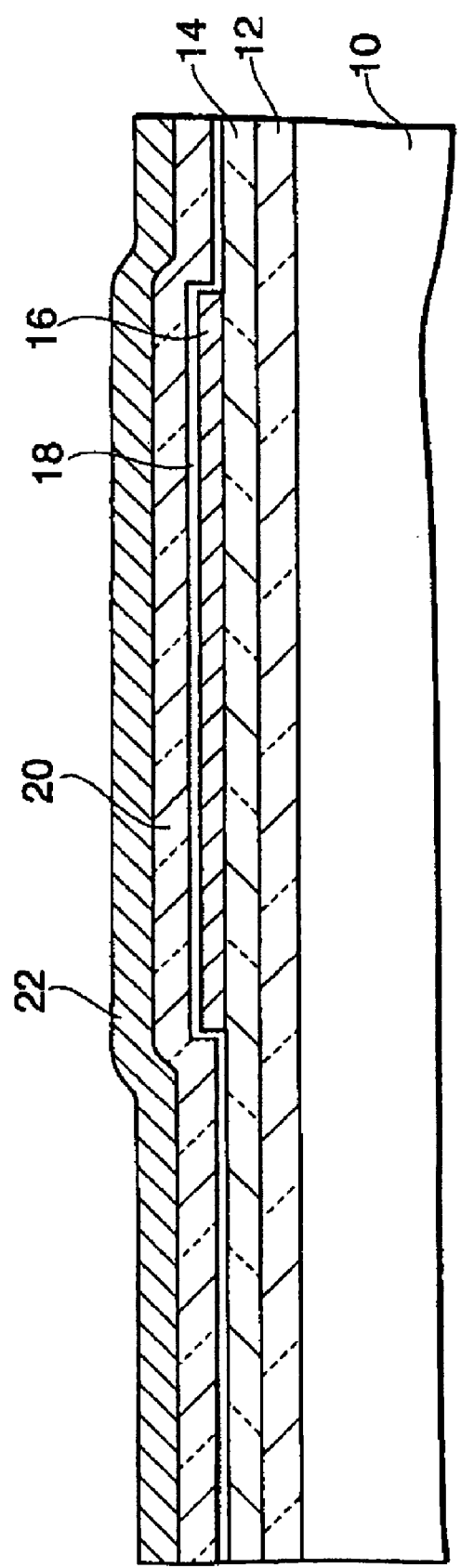
FIG. 4 is a cross-sectional view showing a second step regarding polysilicon deposition in the manufacturing method for the IC device shown in FIG. 1.

In a second step shown in FIGS. 4 and 8, an insulating film 20 composed of silicon oxide or doped silicon oxide (such as PSG, BSG, and BPSG) is formed on the insulating film 18 in accordance with the CVD method. Herein, BPSG and PSG allow etching to be performed with ease because they have high-speed etching rates. The insulating film 20 acts as a sacrificing film assisting the formation of an opening 20a shown in FIG. 1, wherein the thickness thereof ranges from 100 nm to 1000 nm, preferably, it ranges from 500 nm to 800 nm, and further preferably, it is set to 650 nm. The insulating film 20 is not necessarily formed by the CVD method; that is, it can be constituted by a silicon oxide film that can be formed by the spin-coat method, namely, SOG (spin on glass). SOG has a higher etching rate compared with BPSG and preferably suits a sacrificing film that can be removed with ease. SOG is subjected to annealing (at a high temperature ranging from 350° C. to 800° C.) as necessary, by which the etching rate thereof can be adjusted.

When the insulating films 14, 18, and 20 are laminated together, as shown in FIG. 8, connection holes $20_S$ and $20_D$ are formed in correspondence with the source region S and drain region D of the transistor TR in accordance with photolithography and dry etching. Then, a polysilicon layer 22 composed of doped polysilicon is formed by the CVD method so as to cover the connection holes $20_S$ and $20_D$ on the insulating film 20. The polysilicon layer 22 is used for the formation of the semiconductor layers 22a–22c, capacitance electrode layer 22X, and resistance layers 22P, 22Q, and 22R, which act as components of the physical quantity sensor, and is also used for the formation of a source electrode region 22S, a drain electrode region 22D, and a wiring layer 22K (see FIG. 9) in the transistor-related region including the transistor TR, wherein the thickness thereof ranges from 100 nm to 2000 nm, preferably, it is set to 500 nm.

In a third step shown in FIGS. 5 and 9, the polysilicon layer 22 is subjected to patterning by photolithography and dry etching, thus forming the semiconductor layers 22a–22c, capacitance electrode layer 22X, resistance layers 22P, 22Q, and 22R, source electrode layer 22S, drain electrode layer 22D, and wiring layer 22K. Tungsten is used as a weight implementing metal covering the aforementioned layers 22a–22c, 22X, 22P–22R, 22S, 22D, and 22K on the insulating film 20, wherein it is subjected to sputtering or CVD (which is preferable for the formation of a thick film), thus forming a tungsten layer, which is then subjected to patterning by photolithography and dry etching so as to form a weight layer 24W, a source electrode layer 24S, a drain electrode layer 24D, and a wiring layer 24K. Herein, the weight layer 24W is formed on the semiconductor layer 22c; the source electrode layer 24S is formed on the source electrode layer 22S; and the drain electrode layer 24D is formed on the drain electrode layer 22D. The thickness of the tungsten layer ranges from 500 nm to 1000 nm, and preferably, it is set to 500 nm.

In the above, the polysilicon layer 22 is subjected to patterning, and then the tungsten layer is subjected to patterning. Of course, it is possible to reverse the patterning order between these layers. That is, the tungsten layer is formed on the polysilicon layer 22 and is then subjected to patterning; thereafter, the polysilicon layer 22 is subjected to patterning. As the weight implementing metal used for the formation of the weight layer 24W, it is possible to use other metals (other than tungsten), i.e., heavy metals (e.g., Ta, Hf, Ir, Pt, and Au), relatively heavy metals suited to Si (e.g., Zr, Nb, Mo, and Pd), and low-resistance metals (e.g., Ti, Cr, Ni, Co, and Cu) that are heavier than Si.

In a fourth step shown in FIGS. 6 and 9, an insulating film 26 composed of silicon oxide is formed to cover the aforementioned layers, i.e., semiconductor layers 22a–22c, capacitance electrode layer 22X, resistance layers 22P–22R, source electrode layers 22S and 24S, drain electrode layers 22D and 24D, wiring layers 22K and 24K, and weight layer 24W, on the insulating film 20. It is preferable that spin-on glass or hydrogen silsesquioxane be subjected to rotational application so as to form a film, which is then subjected to heat treatment so as to form the insulating film 26 having a good planarity. The insulating film 26 is subjected to etching together with the insulating film 20 in the following step; therefore, it is preferable that insulating film 26 be composed of a prescribed material whose etching rate substantially matches that of the insulating film 20. Of course, it is possible to decrease the etching rate of the insulating film 20 to be slightly lower than the etching rate of the insulating film 26. This realizes good etching-implemented shapes and makes it difficult for water marks to remain in cleaning and drying. Then, a passivation insulating film 29 composed of silicon nitride is formed by the CVD method on the insulating film 26.

Next, a resist layer having a hole is formed by photolithography on the insulating film 29; then, dry etching is performed using the resist layer as a mask so as to selectively remove prescribed portions of the insulating film 29, thus forming an opening 29a. Thereafter, isotropic wet etching is performed using the resist layer (which was previously used for the dry etching) and the insulating film 29 having the opening 29a as masks so as to form an opening 26a for the insulating film 26 and an opening 20a for the insulating film 20. The opening 26a is formed subsequent to the opening 29a; and the opening 20a is formed subsequent to the opening 26a. As a result, as shown in FIG. 6, coil-like portions of the semiconductor layers 22a and 22b, and beam portions of the semiconductor layer 22c (having the weight layer 24W) and the capacitance electrode layer 22X are floating in the space of the overall hollow realized by the openings 20a and 26a and are exposed in the opening 29a. After completion of the isotropic wet etching, the resist layer is removed by the known method. It is possible to use buffered hydrofluoric acid for the isotropic wet etching, for example. Incidentally, the isotropic wet etching can be replaced with isotropic dry etching. In this case, the insulating film 20 is composed of BPSG, and the insulating film 26 is composed of SOG that is cured at 400° C., wherein the lamination of the insulating films 20 and 26 is subjected to reactive ion etching (RIE) or chemical dry etching (CDE). Herein, RIE uses $CF_4+O_2$ gas, and CDE uses $CHF_3$ gas.

The resist layer can be removed just after the dry etching. Herein, the isotropic wet etching is performed using only the insulating film 29 having the opening 29a as a mask.

Next, a modified example of the manufacturing method, which is described above with reference to FIGS. 2 to 9, will be described with reference to FIGS. 10 to 12, wherein parts identical to those shown in FIGS. 2 to 9 are designated by the same reference numerals; hence, the detailed description thereof will be omitted. The modified example is characterized by the simultaneous formation of the source electrode layer 24S and the drain electrode layer 24D, which serve as contact layers, as well as the weight layer 24W in the transistor TR.

Figure 10:
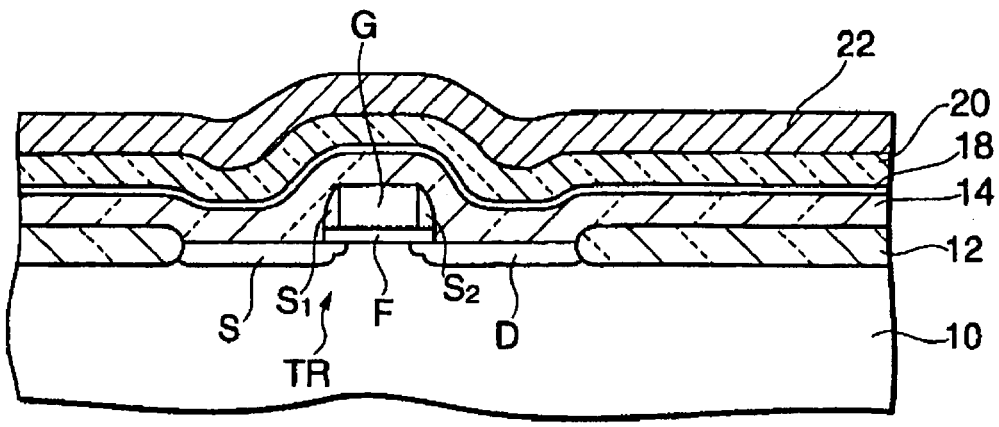
FIG. 10 is a cross-sectional view showing a transistor-related region regarding the insulating film formation and polysilicon deposition in a modified example of the manufacturing method.

In the modified example shown in FIG. 10, which is similar to the second step shown in FIG. 4, after completion of the first step shown in FIG. 3, the insulating film 20 composed of silicon oxide or doped silicon oxide (e.g., PSG, BSG, and BPSG) is formed on the insulating film 18, and the polysilicon layer 22 composed of doped polysilicon is formed on the insulating film 20.

Figure 11:
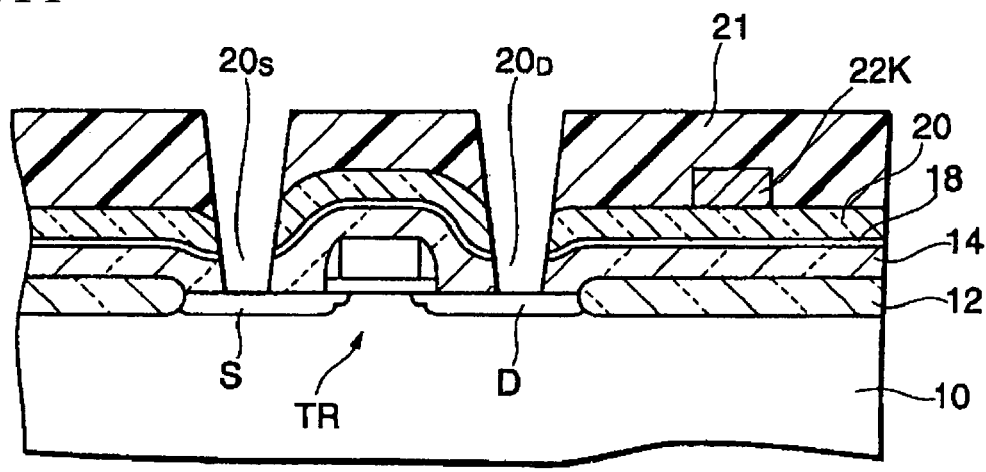
FIG. 11 is a cross-sectional view showing the transistor-related region regarding the polysilicon patterning and connection hole formation in the modified example of the manufacturing method.

In the modified example shown in FIG. 11, which is similar to the third step shown in FIG. 5, the polysilicon layer 22 is subjected to patterning by photolithography and dry etching so as to form the wiring layer 22K, wherein as shown in FIG. 5, the semiconductor layers 22a–22c, capacitance electrode layer 22X, and resistance layers 22P–22R are formed on the insulating film 20 above the substrate 10.

Next, a resist layer 21 is formed by photolithography to cover the wiring layer 22K, semiconductor layers 22a–22c, capacitance electrode layer 22X, and resistance layers 22P–22R on the insulating film 20. The resist layer 21 has holes in correspondence with the source connection hole $20_S$ and the drain connection hole $20_D$. Then, dry etching is performed using the resist layer 21 as a mask so as to form the source connection hole $20_S$ and the drain connection hole $20_D$ in correspondence with the source region S and the drain region D in the lamination of the insulating films 14, 18, and 20. Thereafter, the resist layer 21 is removed.

Figure 12:
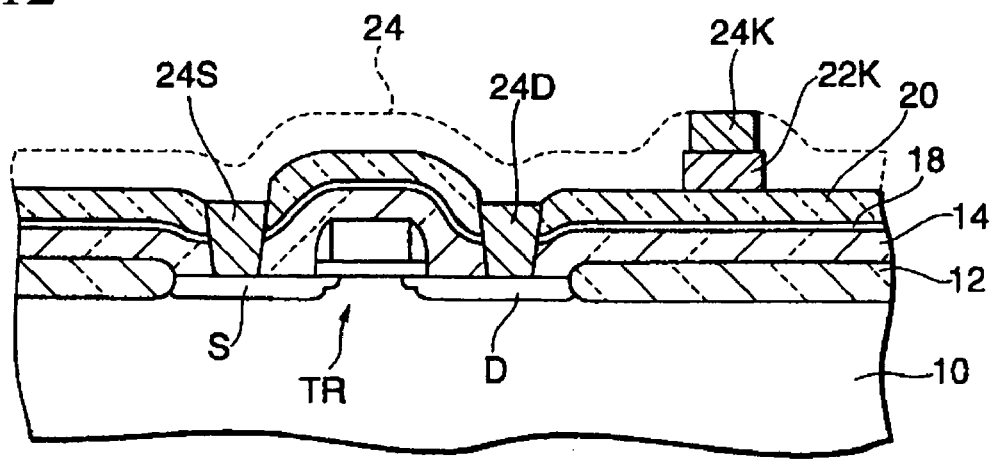
FIG. 12 is a cross-sectional view showing the transistor-related region regarding the tungsten deposition and patterning in the modified example of the manufacturing method.

In the modified example shown in FIG. 12, a tungsten layer 24 serving as a weight-implementing metal layer, is formed by sputtering or CVD to cover the connection holes $20_S$ and $20_D$, wiring layer 22K, semiconductor layers 20a–20c, capacitance electrode layer 22X, and resistance layers 22P–22R. Alternatively, it is possible to form a barrier metal layer corresponding to the lamination of a Ti layer and a TiN layer prior to the formation of the tungsten layer 24, which is thus formed on the barrier metal layer.

Next, first and second resist layers having patterns corresponding to the wiring layer 22K and semiconductor layer 22c are formed on the tungsten layer 24 by photolithography.

Next, dry etching is performed using the first and second resist layers as masks on the tungsten layer 24, which is thus subjected to "etching back", in which the barrier metal layer is subjected to etching back as necessary, so as to form the source electrode layer 24S, drain electrode layer 24D, wiring layer 24K, and weight layer 24W. The source electrode layer 24S and the drain electrode layer 24D are respectively connected with the source region S and the drain region D via the connection holes $20_S$ and $20_D$ (see FIG. 11). Herein, the wiring layer 24K and the weight layer 24W are respectively formed on the wiring layer 22K and the semiconductor layer 22c.

Thereafter, as similar to the fourth step shown in FIGS. 6 and 9, the insulating films 26 and 29 are formed, and the openings 29a, 26a, and 20a are formed.

According to the aforementioned manufacturing method, which is described above with reference to FIGS. 3 to 12, it is possible to easily produce the IC device including the physical quantity sensor (see FIG. 1) and its peripheral circuit in accordance with semiconductor manufacturing processes. Notably, according to the modified example shown in FIGS. 10 to 12, the electrode layers (or contact layers) 24S and 24D are formed using W plugs having low resistances; hence, it is possible to further improve transistor characteristics.

Figure 13:
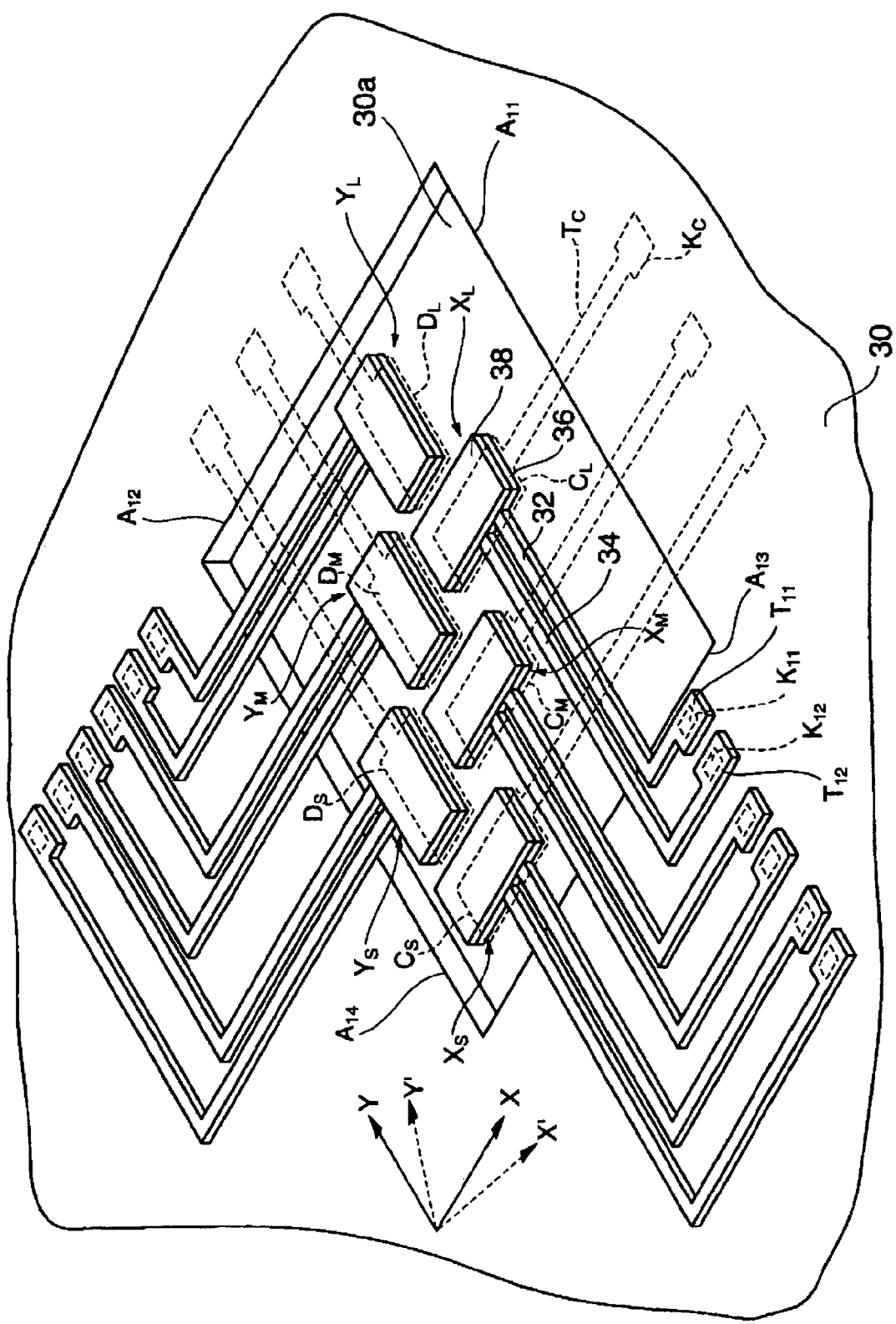
FIG. 13 is a perspective view showing a physical quantity sensor in accordance with a second embodiment of the invention.
Figure 14:
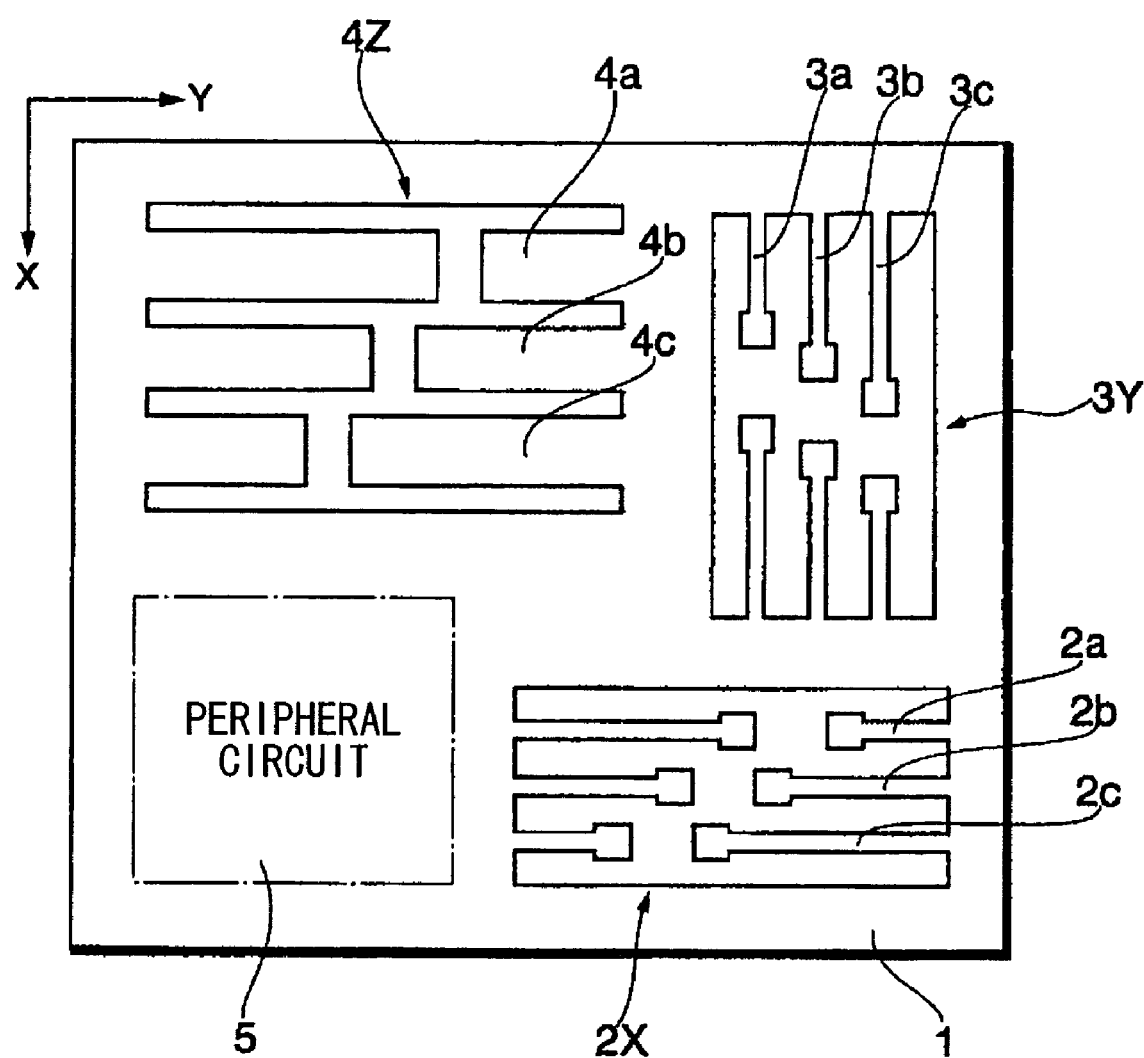
FIG. 14 is a plan view showing the layout of circuit components arranged on the main surface of a substrate used for a piezoelectric sensor.

FIG. 13 shows a physical quantity sensor in accordance with a second embodiment of the invention, which is designed to well suit the detection of the inclination of a substrate.

An insulating film 30 composed of silicon oxide is formed on the main surface of a semiconductor substrate (similar to the semiconductor substrate 10 shown in FIG. 1) via a field insulating film (corresponding to the insulating film 12) and a pad insulating film (corresponding to the insulating film 14), wherein it has a rectangular opening 30a allowing six piezoelectric sensors $X_L$, $X_M$, $X_S$, $Y_L$, $Y_M$, and $Y_S$ to be arranged therein.

Six capacitance electrode layers $C_L$, $C_M$, $C_S$, $D_L$, $D_M$, and $D_S$ are arranged on the pad insulating film just below the insulating layer 30 in the bottom of the opening 30a defined by four sides $A_{11}$, $A_{12}$, $A_{13}$, and $A_{14}$. Similar to the capacitance electrode layer 16, the capacitance electrode layers $C_L$, $C_M$, $C_S$, $D_L$, $D_M$, and $D_S$ are each composed of doped polysilicon or metals, wherein they can be covered with an insulating film (corresponding to the insulating film 18) composed of silicon nitride. The capacitance electrode layers $C_L$, $C_M$, $C_S$, $D_L$, $D_M$, and $D_S$ are respectively arranged opposite to the piezoelectric sensors $X_L$, $X_M$, $X_S$, $Y_L$, $Y_M$, and $Y_S$, wherein they are each formed in rectangular patterns in correspondence with the piezoelectric sensors $X_L$, $X_M$, $X_S$, $Y_L$, $Y_M$, and $Y_S$.

The capacitance electrode layer $C_L$ has a terminal Tc that is extended externally from the side $A_{11}$ of the opening 30a on the pad insulating film just below the insulating film 30, and the terminal Tc has a contact Kc on the pad insulating film just below the insulating film 30. The contact Kc of the terminal Tc is connected with a wiring layer (not shown) via a connection hole formed in the insulating film 30. Similar to the capacitance electrode layer $C_L$, the other capacitance electrode layers $C_M$, $C_S$, $D_L$, $D_M$, and $D_S$ have terminals having contacts, which are respectively connected with wiring layers (not shown).

The piezoelectric sensors $X_L$, $X_M$, and $X_S$ are each formed in a cantilever manner, wherein they are arranged in relation to the side $A_{13}$ of the opening 30a (opposite to the side $A_{12}$) and are elongated from the insulating film 30 inwardly into the opening 30a in parallel with the side $A_{11}$ adjacent to the side $A_{13}$. The piezoelectric sensor $X_L$ includes a first semiconductor layer 32 and a second semiconductor layer 34, which are elongated from the insulating film 30 inwardly into the opening 30a, and a third semiconductor layer 36, which is formed subsequent to tip ends of the semiconductor layers 32 and 34 in the opening 30a and which has a weight layer 38 fixed thereon. Other ends of the semiconductor layers 32 and 34 are fixed onto the insulating film 30 so as to form terminals $T_{11}$ and $T_{12}$. Thus, the sensing portion of the physical quantity sensor is constituted such that the semiconductor layers 32 and 34 support the semiconductor layer 36 to realize three-dimensional displacement. All the semiconductor layers 32, 34, and 36 are composed of doped polysilicon, and the weight layer 38 is composes of tungsten. The capacitance electrode layer $C_L$ and the semiconductor layer 36 form electrostatic capacity (or capacitance). The displacement of the semiconductor layer 36 is detected based on resistance variations of the semiconductor layers 32 and 34 due to piezoresistance effects and capacitance variations of the capacitance electrode layer $C_L$.

The piezoelectric sensors $X_M$ and $X_S$ have constitutions similar to the constitution of the piezoelectric sensor $X_L$, wherein they differ from the piezoelectric sensor $X_L$ in lengths of beam portions thereof overlapping the opening 30a in plan view. That is, the piezoelectric sensors $X_L$, $X_M$, and $X_S$ have different beam lengths overlapping the opening 30a in plan view such that $X_L$ has longest beam lengths, $X_M$ has intermediate beam lengths, and $X_S$ has short beam lengths. Similar to the piezoelectric sensor $X_L$ having the semiconductor layer 36, the piezoelectric sensor $X_M$ has a 'weighted' semiconductor layer, which is formed at the tip ends of the beam portions thereof and which has a weight layer thereon. Electrostatic capacity (or capacitance) is formed between the weighted semiconductor layer of the piezoelectric sensor $X_M$ and the capacitance electrode layer $C_M$. Similarly, the piezoelectric sensor $X_S$ has a 'weighted' semiconductor layer, which is formed at the tip ends of the beam portions thereof and which has a weight layer thereon. Electrostatic capacity (or capacitance) is formed between the weighted semiconductor layer of the piezoelectric sensor $X_S$ and the capacitance electrode layer $C_S$. In each of the piezoelectric sensors $X_M$ and $X_S$, the displacement of the weighted semiconductor layer is detected based on resistance variations of two semiconductor layers forming beam portions (similar to the semiconductor layers 32 and 34 of the piezoelectric sensor $X_L$) and capacitance variations of the corresponding capacitance electrode layer (i.e., $C_M$ and $C_S$).

All the piezoelectric sensors $Y_L$, $Y_M$, and $Y_S$ are formed in a cantilever manner, wherein with respect to the side $A_{14}$ opposite to the side $A_{11}$ of the opening 30a, they are elongated from the insulating film 30 inwardly into the opening 30a in parallel with the side $A_{12}$ adjacent to the side $A_{14}$. The piezoelectric sensors $Y_L$, $Y_M$, and $Y_S$ are constituted similar to the piezoelectric sensors $X_L$, $X_M$, and $X_S$, wherein the beam lengths thereof overlapping the opening 30a in plan view are respectively identical to the beam lengths of the piezoelectric sensors $X_L$, $X_M$, and $X_S$.

The piezoelectric sensors $Y_L$, $Y_M$, and $Y_S$ have weighted semiconductor layers (similar to the semiconductor layer 36 of the piezoelectric sensor $X_L$) at the tip ends of the beam portions thereof, wherein capacitances are formed between the weighted semiconductor layers and the capacitance electrode layers $D_L$, $D_M$, and $D_S$ respectively. In each of the piezoelectric sensors $Y_L$, $Y_M$, and $Y_S$, the displacement of the weighted semiconductor layer is detected based on resistance variations of two semiconductor layers realizing beam portions (similar to the semiconductor layers 32 and 34) and capacitance variations of the corresponding capacitance electrode layer (i.e., $D_L$, $D_M$, and $D_S$).

The capacitance electrode layers $C_L$, $C_M$, $C_S$, $D_L$, $D_M$, and $D_S$ are arranged independently of each other in correspondence with the piezoelectric sensors $X_L$, $X_M$, $X_S$, $Y_L$, $Y_M$, and $Y_S$ respectively. It is possible to modify the present embodiment such that the capacitance electrode layers $C_L$ and $D_L$ are mutually connected together in connection with the piezoelectric sensors $X_L$ and $Y_L$; the capacitance electrode layers $C_M$ and $D_M$ are mutually connected together in connection with the piezoelectric sensors $X_M$ and $Y_M$; and the capacitance electrode layers $C_S$ and $D_S$ are mutually connected together in connection with the piezoelectric sensors $X_S$ and $Y_S$.

Suppose that under the condition where the main surface of the substrate 10 is horizontally supported, the piezoelectric sensors $X_L$, $X_M$, and $X_S$ are elongated in the Y-axis direction perpendicular to the X-axis direction in parallel with the main surface of the substrate 10. In this case, it is possible to rotate the substrate 10 about a rotation axis lying in parallel with the X-axis direction so that the substrate 10 is inclined as shown by a dotted arrow Y'; and it is possible to rotate the substrate 10 about a rotation axis lying in parallel with the Y-axis direction so that the substrate 10 is inclined as shown by a dotted arrow X'. Hereinafter, the inclination of the substrate 10 that is inclined as shown by the dotted arrow Y' will be referred to as "X-axis inclination", and the inclination of the substrate 10 that is inclined as shown by the dotted arrow X' will be referred to as "Y-axis inclination".

Table 1 shows magnitudes of resistances and capacitances of the piezoelectric sensors $X_L$, $X_M$, and $X_S$ with respect to the X-axis inclination and the Y-axis inclination respectively. As to the piezoelectric sensor $X_L$, for example, "R" represents the sum of the resistances of the semiconductor layers 32 and 34, and "C" represents the capacitance formed between the semiconductor layer 36 and the capacitance electrode layer $C_L$. Three inclination angles, i.e., 0°, 45°, and 90°, are listed with respect to each of the X-axis inclination and Y-axis inclination in Table 1, wherein "inclination angle 0°" designates the horizontal state of the main surface of the substrate 10.

TABLE 1

| Sensor | Inclination Angle | X-axis Inclination R | X-axis Inclination C | Y-axis Inclination R | Y-axis Inclination C |
|---|---|---|---|---|---|
| $X_L$ | 0° | MAX | Short | MAX | Short |
|  | 45° | MID | MID | Smaller | Smaller |
|  | 90° | MIN | MIN | Smaller | Smaller |
| $X_M$ | 0° | MID | MAX | MID | MID |
|  | 45° | MIN | MID | Smaller | Smaller |
|  | 90° | — | — | — | — |
| $X_S$ | 0° | MIN | MID | MIN | MIN |
|  | 45° | — | MIN | — | — |
|  | 90° | — | — | — | — |

In Table 1, "MAX", "MID", and "MIN" represent "maximum", "intermediate" (or "middle"), and "minimum" respectively. Symbol "-" represents no change regarding resistance or capacitance, regardless of increases of inclination angles. "Short" represents a short-circuit event in which the weighted semiconductor layer (e.g., 36) at the tip ends of the beam portions of the piezoelectric sensor comes in contact with the capacitance electrode layer (e.g., $C_L$). "Smaller" represents that resistance variations or capacitance variations occurring in the Y-axis inclination are smaller than those occurring in the X-axis inclination. Incidentally, the overall capacitance of the physical quantity sensor increases in response to the displacement applied in the direction regarding the lower surface of the substrate, i.e., in the negative direction of the Z-axis, while it decreases in response to the displacement applied in the direction regarding the upper surface of the substrate, i.e., in the positive direction of the Z-axis. Thus, the physical quantity sensor of the present embodiment is capable of detecting three-dimensional displacements including X-axis inclination, Y-axis inclination, and Z-axis displacement.

Table 1 shows that resistance variations of the piezoelectric sensors decrease as the lengths of the beam portions overlapping the opening 30a in plan view decrease, wherein resistance variations of the piezoelectric sensor $X_M$ are smaller than those of the piezoelectric sensor $X_L$, and resistance variations of the piezoelectric sensor $X_S$ are smaller than those of the piezoelectric sensor $X_M$. As to the piezoelectric sensor $X_L$, for example, the resistance and capacitance are both denoted as "MID" in the X-axis inclination of 45°, while the resistance and capacitance in the Y-axis inclination of 45° are both smaller than those in the X-axis inclination of 45°. This is because in the X-axis inclination, the semiconductor layer 36 is subjected to displacement only in the prescribed direction perpendicular to the main surface of the substrate 10, while in the Y-axis inclination, the semiconductor layer 36 is subjected to bidirectional displacement applied in the prescribed direction perpendicular to the main surface of the substrate 10 and the X-axis direction. Thus, it is possible to detect the inclination angle and inclination direction based on the combination of electric signals representing resistance variations and capacitance variations of the piezoelectric sensors $X_L$, $X_M$, and $X_S$, wherein electric signals are subjected to addition, for example.

Incidentally, it is possible to easily create a similar table regarding the piezoelectric sensors $Y_L$, $Y_M$, and $Y_S$ by partially rewriting the content of Table 1 in such a way that "$X_L$", "$X_M$", and "$X_S$" are replaced with "$Y_L$", "$Y_M$", and "$Y_S$"; "X-axis Inclination" is replaced with "Y-axis Inclination"; and "Y-axis Inclination" is replaced with "X-axis Inclination", whereby "Smaller" represents that resistance variations or capacitance variations occurring in the X-axis inclination are smaller that those occurring in the Y-axis inclination. With reference to such a table, it is possible to understand resistance variations and capacitance variations in response to the Y-axis inclination and X-axis inclination with respect to each of the piezoelectric sensors $Y_L$, $Y_M$, and $Y_S$. Similar to the piezoelectric sensors $X_L$, $X_M$, and $X_S$, it is possible to detect the inclination angle and inclination direction based on the combination of electric signals representing resistance variations and capacitance variations of the piezoelectric sensors $Y_L$, $Y_M$, and $Y_S$, wherein electric signals are subjected to addition, for example. In addition, it is possible to detect variations of signals in response to acceleration applied to the physical quantity sensor. For example, it is possible to calculate acceleration or deceleration by an operation circuit (that is arranged on the substrate or arranged externally of the substrate) based on time-related variations of the output of the physical quantity sensor, which is maintained constant in the uniformly accelerated motion.

In FIG. 13, the physical quantity sensor using the piezoelectric sensors $X_L$, $X_M$, and $X_S$ and the piezoelectric sensors $Y_L$, $Y_M$, and $Y_S$, which are arranged on the same substrate, is capable of precisely measuring the X-axis inclination and Y-axis inclination applied thereto. This physical quantity sensor can be easily produced in accordance with the foregoing semiconductor manufacturing processes, which are described with reference to FIGS. 3 to 12.

Both of the physical quantity sensors have conductive weight portions realized by laminating weight layers (e.g., 24W or 38) on semiconductor layers (e.g., 16 or 36). Of course, it is possible to realize conductive weight portions by laminating semiconductor layers on weight layers. Alternatively, it is possible to increase the thickness of the semiconductor layer to have a weight function, so that the weight layer can be omitted. In addition, it is possible to form two semiconductor layers (e.g., 22a and 22b, or 32 and 34) by processing a conductive layer (e.g., a tungsten layer) having a weight function.

Next, a third embodiment of the invention will be described with reference to FIGS. 15 to 17, which show a bearing sensor that is constituted by combining a physical quantity sensor and magnetic sensors, wherein parts identical to those shown in FIGS. 1, 5, and 6 are designated by the same reference numerals. As magnetic sensors, it is possible to use magnetoresistive elements such as giant magnetoresistive elements (or GMR elements). Specifically, as shown in FIG. 15, an X-axis magnetic sensor 100X and a Y-axis magnetic sensor 100Y are arranged at different positions in the periphery of a physical quantity sensor (similar to the physical quantity sensor shown in FIG. 1) on the same substrate 10, wherein each magnetic sensor includes two or more GMR elements whose sensing directions cross each other, so that a bearing is determined based on variations of resistances of GMR elements in response to a magnetic field applied thereto from the exterior.

Figure 15:
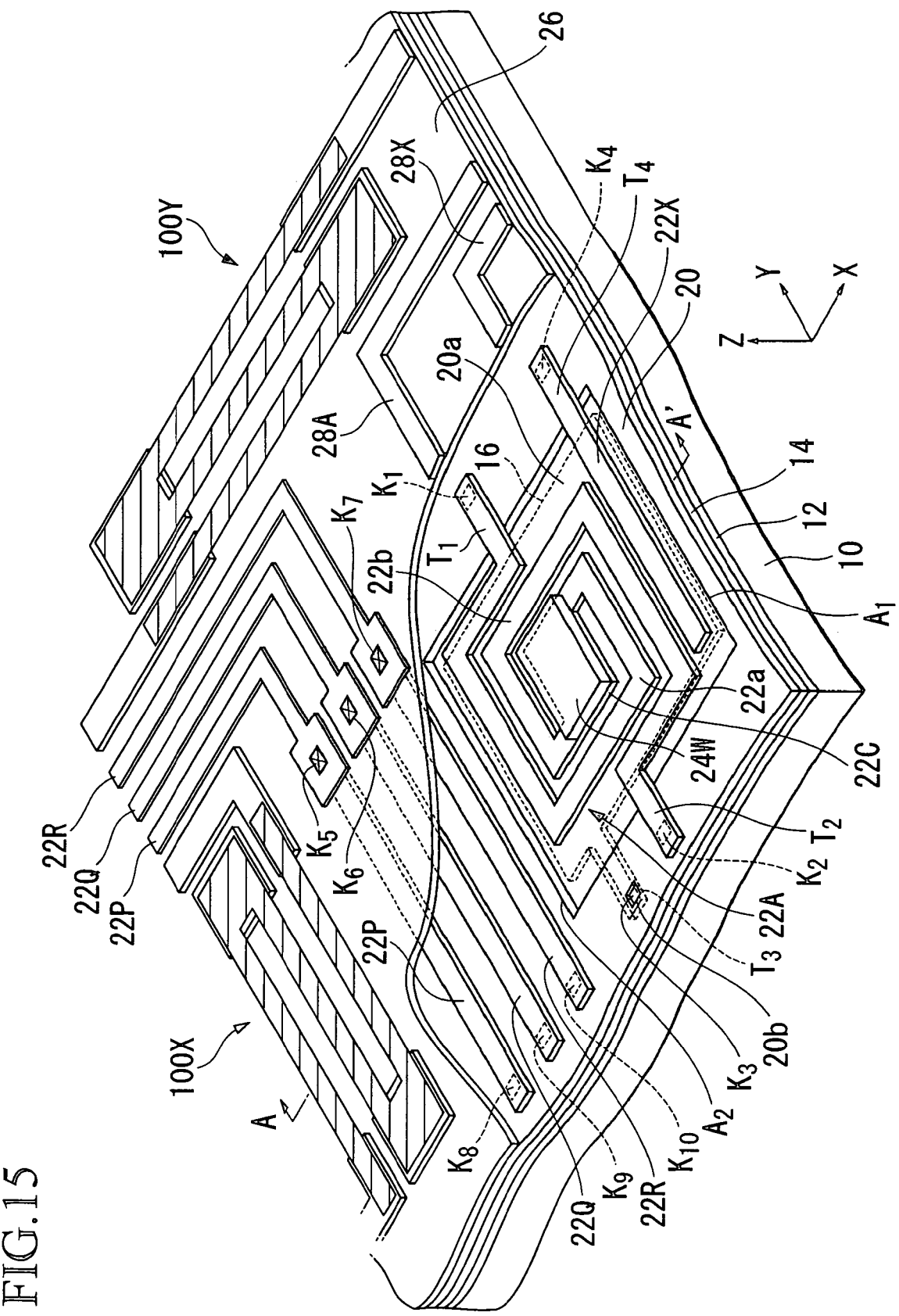
FIG. 15 is a perspective view showing a bearing sensor in which a physical quantity sensor and magnetic sensors are arranged on the same substrate in accordance with a third embodiment of the invention.

The manufacturing method regarding the bearing sensor shown in FIG. 15 is similar to the aforementioned manufacturing method with regard to the physical quantity sensor; hence, the technical features regarding a magnetic sensor 100 (representing the magnetic sensors 100X and 100Y) will be described below.

The illustration of FIG. 15 is drawn by partially modifying the illustration of FIG. 5 regarding the third step of the manufacturing method of the IC device including the physical quantity sensor, wherein the magnetic sensor 100 composed of permanent magnets and GMR elements (see '22G') is additionally formed together with the foregoing components of the physical quantity sensor on the same substrate 10. The magnetic sensor 100 is formed and then subjected to patterning after the formation of the passivation film 29.

The GMR element is composed of PtMn, CoFe, Cu, CoFe, NiFe, and CoZrNb, which are sequentially laminated together from the top to the bottom. In addition, the GMR element is constituted by a spin-valve film composed of a free layer, a spacer layer, and a pinned layer, wherein a permanent magnet applies a bias magnetic field to the free layer in order to maintain uniaxial anisotropy.

Figure 16:
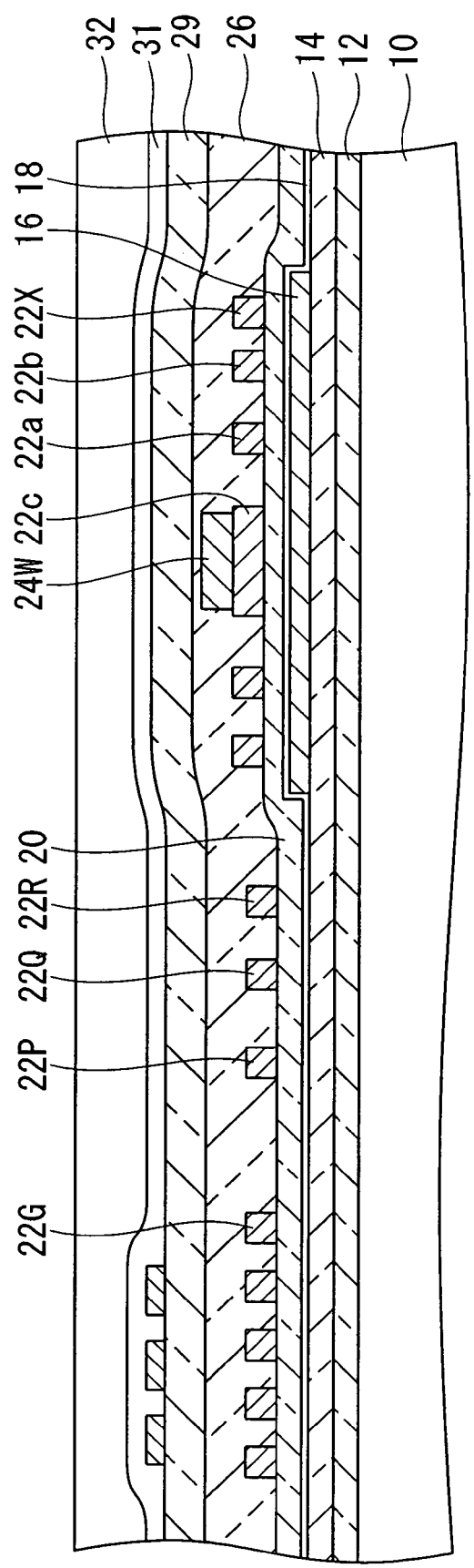
FIG. 16 is a cross-sectional view showing a manufacturing step regarding the bearing sensor shown in FIG. 15, which is similar to the third step shown in FIG. 5 and in which the magnetic sensor is simultaneously formed together with the physical quantity sensor.

Then, a second passivation film 31 composed of SiN or SiON and a protection film 32 composed of polyimide are sequentially formed as shown in FIG. 16.

Figure 17:
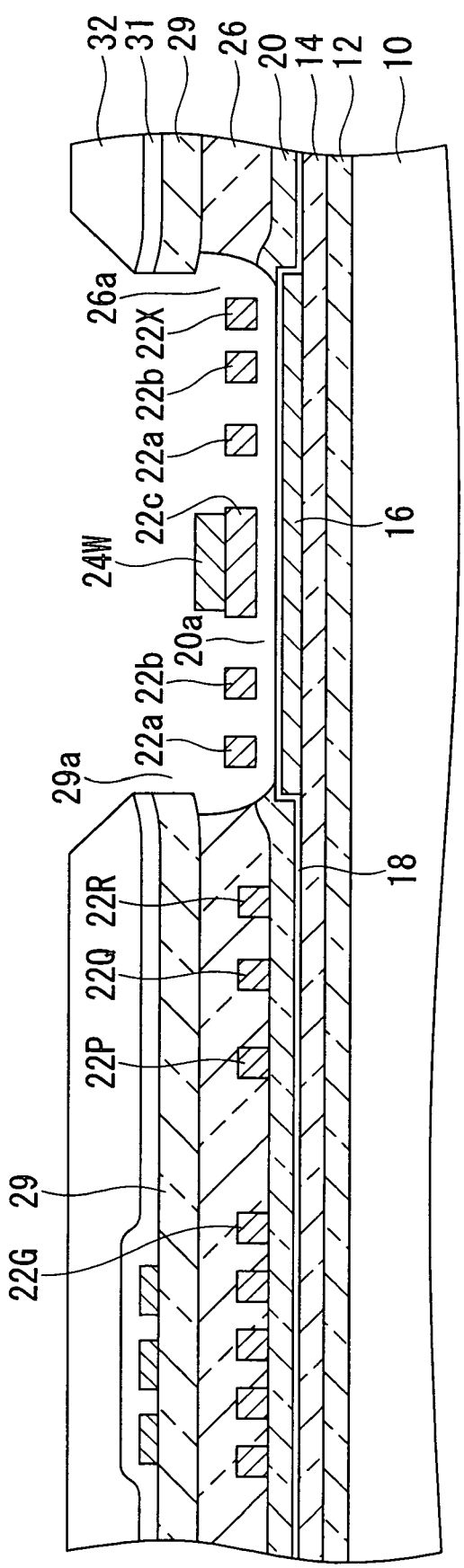
FIG. 17 is a cross-sectional view showing a manufacturing step regarding the bearing sensor shown in FIG. 15, which is similar to the fourth step shown in FIG. 6 and in which the magnetic sensor is simultaneously formed together with the physical quantity sensor.

As shown in FIG. 17, an opening is formed through the second passivation film 31 and the protection film 32 with respect to the physical quantity sensor, so that the foregoing capacitance electrode layers and weight layer are exposed in the hollow.

The bearing sensor of the present embodiment is designed such that two magnetic sensors (i.e., '100X' and '100Y') are arranged in proximity to each other along adjacent sides of the physical quantity sensor. Of course, it is possible to arrange four magnetic sensors along four sides of the physical quantity sensor, which are connected together to form a bridge circuit.

When the bearing sensor is inclined, it is possible to compensate for the output of the magnetic sensor by use of the output of the physical quantity sensor; hence, it is possible to accurately determine the bearing. In addition, the present embodiment is preferably applied to applications requiring sensing abilities regarding both the inclination and bearing.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A physical quantity sensor comprising:
   a substrate;
   an insulating film having an opening, which is formed to partially expose a main surface of the substrate;
   a plurality of piezoelectric sensors each having two terminals, wherein each piezoelectric sensor is constituted such that a sensing portion thereof is arranged in the opening while being supported by the two terminals attached onto the insulating film at different positions in a periphery of the opening, and wherein each piezoelectric sensor comprises a first semiconductor layer having a coil-like winding pattern that is elongated from the periphery of the opening of the insulating film inwardly into the opening, a second semiconductor layer having a coil-like winding pattern that is elongated from the periphery of the opening of the insulating film inwardly into the opening, and a conductive weight portion that mutually connects internal ends of the first and second semiconductor layers in the opening, whereby external ends of the first and second semiconductor layers attached onto the insulating film are used to form the two terminals, and the conductive weight portion is supported by the first and second semiconductor layers in a floating manner in the opening so as to realize three-dimensional displacement therewith; and
   a capacitance electrode layer, which is arranged in a bottom of the opening on the main surface of the substrate so as to establish capacitance between the capacitance electrode layer and the conductive weight portion,
   whereby the displacement of the conductive weight portion is detected based on variations of resistances of the first and second semiconductor layers and variations of the capacitance.

2. A physical quantity sensor according to claim 1 further comprising a second capacitance electrode layer, one end of which is fixed to the insulating film and which establishes second capacitance with respect to the first and second semiconductor layers, wherein the displacement of the conductive weight portion is detected with reference to variations of the second capacitance.

3. A physical quantity sensor according to claim 1, wherein the external ends of the first and second semiconductor layers are attached at opposite positions of the opening of the insulating film.

4. A physical quantity sensor comprising:
   a substrate;
   an insulating film having an opening, which is formed to partially expose a main surface of the substrate;
   a plurality of piezoelectric sensors each having two terminals and a sensing portion, wherein the sensing portion is supported in a floating manner in the opening by the two terminals attached at different positions in periphery of the opening of the insulating film, and wherein each piezoelectric sensor comprises first and second semiconductor layers that are elongated from the periphery of the opening of the insulating film inwardly into the opening in parallel with each other, and a conductive weight portion that mutually connects internal ends of the first and second semiconductor layers in the opening, whereby external ends of the first and second semiconductor layers are attached onto the insulating film so as to form the two terminals, and the conductive weight portion is supported by the first and second semiconductor layers so as to realize three-dimensional displacement therewith; and
   a capacitance electrode layer, which is arranged in a bottom of the opening on the main surface of the substrate so as to form capacitance between the conductive weight portion and the capacitance electrode layer,
   whereby the displacement of the conductive weight portion is detected based on variations of resistances of the first and second semiconductor layers and variations of the capacitance.

5. A physical quantity sensor comprising:
   a substrate;
   an insulating film having an opening, which is formed to partially expose a main surface of the substrate;
   a plurality of piezoelectric sensors each having a sensing portion and two terminals, wherein the sensing portion is supported in a cantilever manner in relation to the opening, and wherein each piezoelectric sensor comprises first and second semiconductor layers that are elongated from a periphery of the opening of the insulating film inwardly into the opening in parallel with each other, and a conductive weight portion that mutually connects internal ends of the first and second semiconductor layers in the opening, whereby external ends of the first and second semiconductor layers are attached onto the insulating film so as to form the two terminals, and the conductive weight portion is supported by the first and second semiconductor layers so as to realize three-dimensional displacement therewith; and
   a plurality of capacitance electrode layers, which are arranged in a bottom of the opening on the main surface of the substrate so as to form capacitances between the conductive weight portion and the capacitance electrode layers respectively,
   whereby the displacement of the conductive weight portion is detected based on variations of resistances of the first and second semiconductor layers and variations of the capacitances.

* * * * *